United States Patent
Zaps

(10) Patent No.: US 6,508,140 B2
(45) Date of Patent: Jan. 21, 2003

(54) GEAR-MOTOR CLOSING-PART DRIVE FOR A MOTOR VEHICLE AND ASSOCIATED METHOD FOR MANUFACTURING THE DRIVE

(75) Inventor: Klaus Zaps, Volkach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/871,732

(22) Filed: Jun. 4, 2001

(65) Prior Publication Data

US 2002/0000135 A1 Jan. 3, 2002

Related U.S. Application Data

(63) Continuation of application No. PCT/DE99/03780, filed on Nov. 29, 1999.

(30) Foreign Application Priority Data

Dec. 4, 1998 (DE) .......................................... 198 56 100

(51) Int. Cl.[7] ................................................. F16D 7/00
(52) U.S. Cl. .......................... 74/411; 74/432; 29/893.1; 464/37
(58) Field of Search .................... 74/411, 432, DIG. 10; 29/893, 893.1; 264/297.8; 464/37, 74, 75, 84

(56) References Cited

U.S. PATENT DOCUMENTS

| 1,962,993 A | * | 6/1934 | Leece ........................... 464/82 |
| 3,406,583 A | * | 10/1968 | Baier ........................... 464/23 |
| 3,762,463 A | * | 10/1973 | Sakaki et al. ................... 165/8 |
| 4,702,122 A | * | 10/1987 | Richard ...................... 192/56.1 |
| 4,766,641 A | * | 8/1988 | Daglow ........................ 15/390 |
| 5,000,721 A | * | 3/1991 | Williams ...................... 192/46 |
| 5,601,491 A | * | 2/1997 | Chan et al. ................. 192/56.1 |

FOREIGN PATENT DOCUMENTS

| DE | 34 03 259 C | 8/1985 | ........... E05F/15/08 |
| EP | 0 261 525 B1 | 3/1988 | ........... E05F/15/16 |
| EP | 0 549 817 B1 | 7/1993 | ............. F16H/1/16 |

\* cited by examiner

Primary Examiner—David A. Bucci
Assistant Examiner—Colby Hansen
(74) Attorney, Agent, or Firm—Sughrue Mion, PLLC

(57) ABSTRACT

In a very simple production and assembly process, reliable stop absorption between a drive-side gear wheel (1) and a driven-side carrier (2) is obtained when there is a mutual relative movement between the gear wheel (1) and the carrier (2) that is caused by the stop. To this end, a cam (2.1) of the carrier (2) elastically deforms a spring element (1.1) of the gear wheel (1) via a tangential stop bevel (1.11; 1.12). The gear wheel (1) and the carrier (2) are preferably configured as injection molded parts, which are axially spaced and interconnected when produced and assembled and which can be axially fit together by releasing or breaking the connection.

19 Claims, 2 Drawing Sheets

GEAR-MOTOR CLOSING-PART DRIVE FOR A MOTOR VEHICLE AND ASSOCIATED METHOD FOR MANUFACTURING THE DRIVE

This is a Continuation of International Application PCT/DE99/03780, with an international filing date of Nov. 29, 1999, which was published under PCT Article 21(2) in German, and the complete disclosure of which is incorporated into this application by reference.

FIELD OF AND BACKGROUND OF THE INVENTION

The present invention relates to a gear-motor closing-part-drive for a motor vehicle. The present invention also relates to an associated method for manufacturing the gear-motor closing-part-drive.

In this type of drive, an electric motor displaces a closing part between a closed end position and an open end position via a gearing mechanism. Therein, the closing part is, for example, a motor vehicle window or motor vehicle sun roof. Preferably, the electric motor is a commutator motor and the gearing mechanism is a worm gearing mechanism.

To absorb undesirable shock loads when the end position is reached or when an obstacle is encountered that would affect the electric motor and, in particular, the gear unit, it is known in the art to provide absorption elements between a drive-side gear wheel and a driven-side carrier.

European Patent EP 0 261 525 B1 teaches stop absorption means for a gear-motor-actuating drive, in which an elastic absorption disk is axially placed between the gear wheel and the carrier. The gear wheel or carrier has axially protruding carrier segments, which engage with corresponding carrier openings of the absorber disk in order to facilitate a mutual slip-free rotational drive in a normal operation mode, or in order to facilitate a mutual relative movement between the gear wheel and the carrier when a stop occurs.

European Patent EP 0 549 817 B1 teaches a stop absorption means for a gear-motor actuating drive, wherein the outer gear rim of the gear wheel is connected with the carrier as an integral injection molded part. This connection is realized via spring-type spokes that are, to a certain extent, tangentially elastic for absorption purposes. A separate absorber insert is dispensed with. A driving pinion may also be connected to the carrier by injection molding. Instead of the integral connection between the gear wheel and the carrier through the spring-type spokes, a carrier connection may be provided in such a way that radial carrying segments of one of the two elements reach between tangentially overlapping carrying forks of the other element. The carrying segments and/or the carrying forks may be elastic to provide tangential stop absorption.

German Patent DE 34 03 259 C1 discloses a window regulator gear unit with a backspring arrangement of two rotatably borne gear parts that are coaxially positioned one behind the other. One of the gear parts is provided with at least one axial carrying projection, which is spaced at a distance from the rotary axis and which engages with preferably vibration-absorbing backspring elements provided on the other gear part. Therein, the at least approximately leaf-spring-type backspring elements are integrally formed with the other gear part. The backspring elements are tangentially elastically deformed by the carrying projections positioned therebetween.

OBJECTS OF THE INVENTION

It is one object of the present invention to provide a stop absorption arrangement. In spite of using very simple production and assembly technology, this stop absorption arrangement should be largely independent from the normal rotational drive between the gear wheel and the carrier when there is a mutual relative movement—such as the mutual relative movement that would arise due to a sudden impediment of the carrier's movement while the gear wheel continues to drive.

SUMMARY OF THE INVENTION

According to one formulation of the present invention, these and other objects are achieved by providing a gear-motor closing part drive for a motor vehicle, which includes a drive-side gear wheel and a driven-side carrier that is in rotary driving engagement with the drive-side gear wheel. At least one of the gear wheel and the carrier has at least one of integral elastic spring elements and cams. The cams are configured to press against the integral elastic spring elements in order to provide mutual stop absorption when a mutual relative rotational movement between the gear wheel and the carrier occurs. Such mutual relative rotational movement between the gear wheel and the carrier is caused, e.g., when the movement of the carrier is inhibited, while the gear wheel continues to be driven. The spring elements include spring segments, which extend substantially tangentially and which have stopping bevels. The spring segments are arranged such that they are radially elastically deformed by the cams, which slidingly run against the stopping bevels when the mutual rotational relative movement between the gear wheel and the carrier occurs.

According to a preferred embodiment of the invention, the gear wheel and the carrier plate are individually configured and have a rotary driving arrangement and a stop absorption arrangement, respectively. When the gear wheel and the carrier plate are assembled, they form an integral unit.

To simplify production, the gear wheel and the carrier are mutually assembled only as they are mounted in a gearbox or drive-side housing that receives the components. Therein, the gearbox or drive-side housing is provided with an associated shaft. The gear wheel and the carrier are produced as separate, axially superimposed injection molded parts, which are cast in a common injection mold as a production or assembly unit. The gear wheel and the carrier are connected as a production or assembly unit. In particular, connecting brackets or the like are integrally injection molded, which can be pulled off as the parts are assembled from their injection molded position into their mutual operating position.

Advantageously, a mutual play-free fit between the assembled components and a suitable pitch of the respective stopping bevel are provided so as to prevent self-locking between the gear wheel and the carrier after a mutual relative movement has occurred that was caused by the stop.

BRIEF DESCRIPTION OF THE DRAWINGS

The invention and further advantageous refinements of the invention according to the features of the dependent claims are explained in more detail below with the aid of diagrammatic, exemplary embodiments in the drawings, in which:

DETAILED DESCRIPTION OF THE PREFERRED EMBODIMENTS

FIGS. 1 to 4 each show a drive-side gear wheel 1 and a carrier 2, which can be operationally brought into a rotary driving engagement with the gear wheel. These components are provided in the drive train between an electric actuating motor and, e.g., a vehicle window. The vehicle window is a closing part that can be moved between an upper closed position and a lower open position. Such structures are disclosed, for instance, in the European patents EP 0 261 525 B1 and EP 0 261 525 B1 mentioned above, the disclosure of which are hereby incorporated into the present application by reference.

Figure 1:
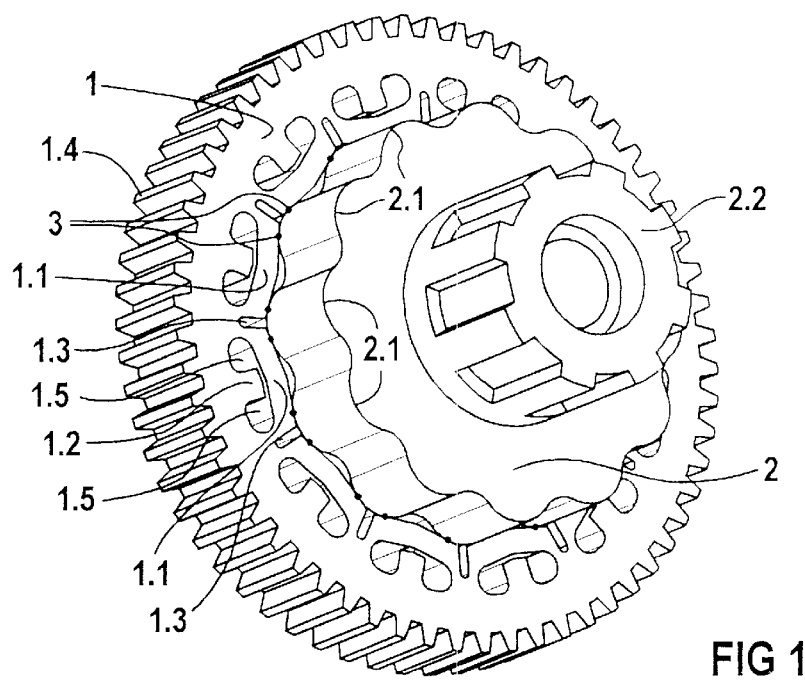
FIG. 1 shows a perspective front view of the gear wheel and the carrier prior to assembly.
Figure 3:
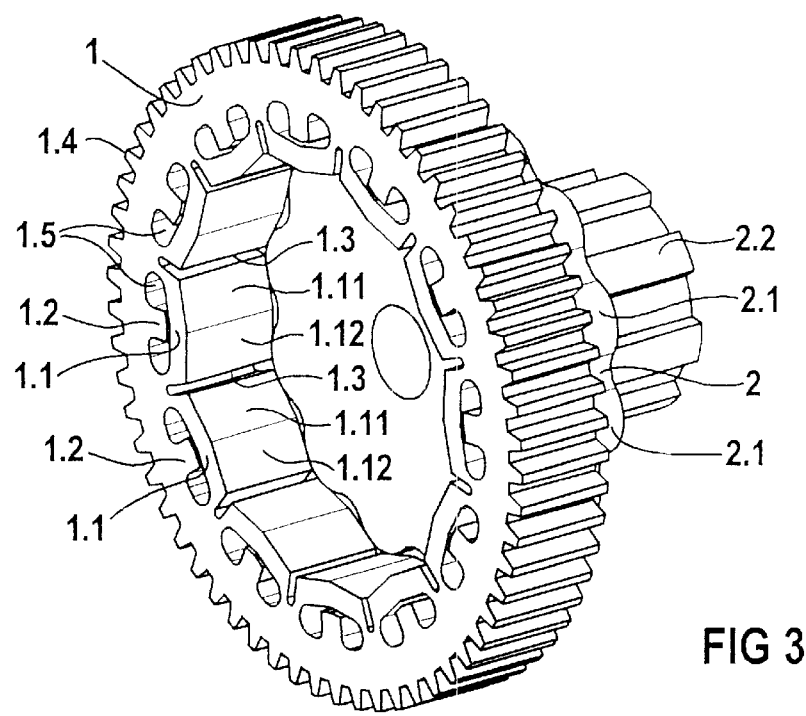
FIG. 3 shows a perspective rear view of the gear wheel and the carrier prior to assembly.

FIG. 1 and FIG. 3 show a perspective front view and a perspective rear view of the individual components of the gear wheel 1 and the carrier 2, respectively. The components are shown in their production position, or preassembly position, and are spaced at an axial distance from one another. Connecting brackets 3 hold the two components together, preferably along their end faces facing one another, to form a production or assembly unit. Advantageously, the connecting brackets 3 are injection molded, together with the two components. Therein, the connection brackets 3 can be pulled off or broken out.

Figure 2:
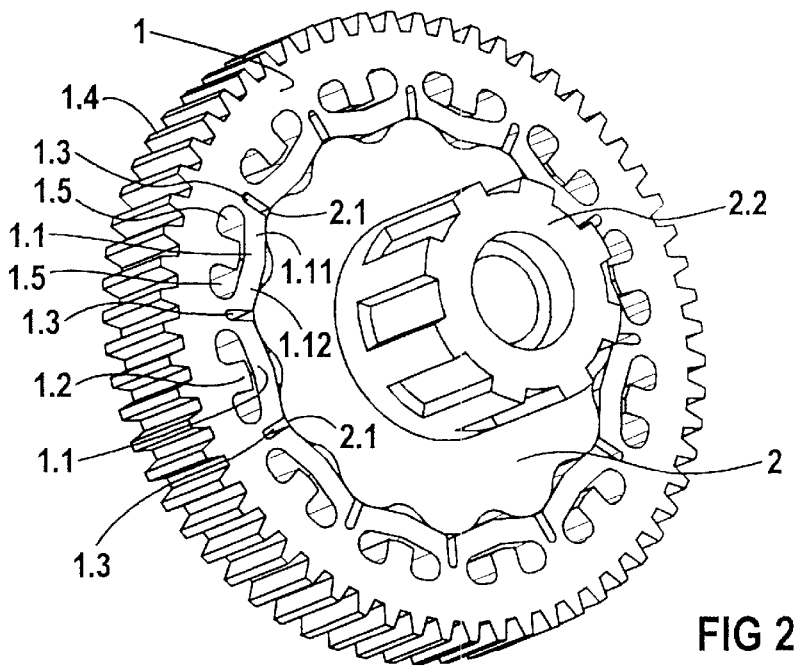
FIG. 2 shows a perspective front view of the gear wheel and carrier after assembly.
Figure 4:
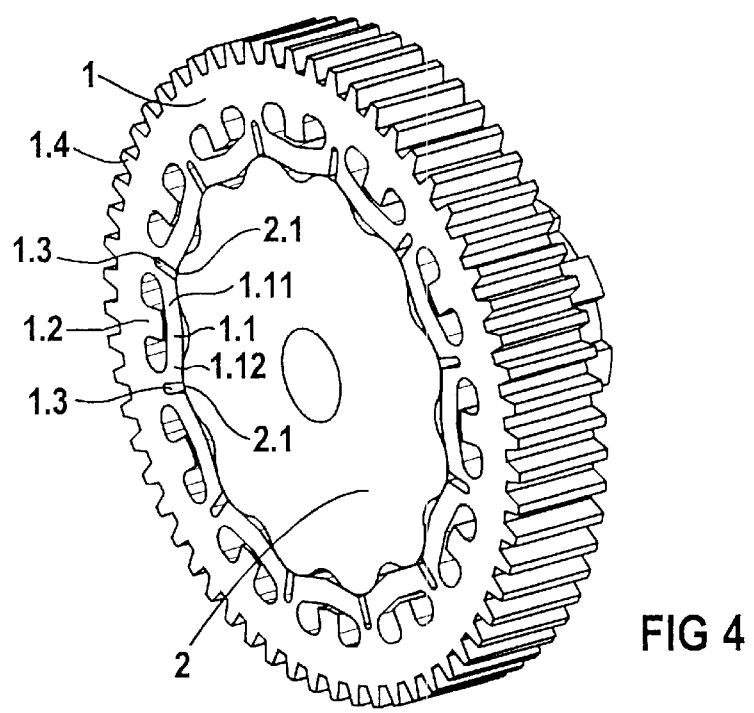
FIG. 4 shows a perspective rear view of the gear wheel and the carrier after assembly.

FIG. 2 and FIG. 4 respectively show a perspective front view and a perspective rear view of the two components, i.e., the gear wheel 1 and the carrier 2, axially assembled for rotational driving engagement. The connecting brackets 3 are now pulled out or broken out. As the components are placed into a gearbox, the carrier 2 is axially inserted into the gear wheel 1, while the axially spaced preassembly connection is released. The gearbox is known in the art and is not separately shown here. Therein, the carrier 2 is mounted on a centric gearbox shaft. As the unit is inserted into the gearbox, the carrier 2, which is positioned axially in front of the gear wheel 1, is advantageously used as an insertion aid so that the components can be automatically inserted into the gearbox.

Along its outer circumference, the gear wheel 1 has gear teeth 1.4, which mesh, in a manner disclosed in the prior art cited above, with a worm gear that is placed on a motor shaft of the driving electric motor of the actuating drive. Therein, the motor shaft is extended to form a gear shaft. Along the inner surface of the gear wheel 1, spring elements 1.1 in the form of substantially tangentially extending segments are provided for stop absorption purposes. In particular, these spring elements 1.1 absorb a hard stop of the closing part (which is to be driven) when it reaches its end position. Along their end faces, these segments merge integrally with the gear wheel 1. Furthermore, these segments can be elastically pushed, in a radially outward direction, into recesses 1.5 that are located between their tangentially formed end-face junctions. The degree of the elastic deformation is defined by limit stops 1.2, which are preferably integrally formed during injection molding.

As may be seen particularly in FIG. 2 and FIG. 4, the carrier 2 is inserted into the inner opening of the gear wheel 1. In order to facilitate an operational rotary drive of the carrier 2, the carrier 2 has cams 2.1 on its outer circumference, which engage, in its drive position, with radially outwardly pointing indentations 1.3 in the gear wheel 1. These indentations 1.3 are arranged between the tangential, end face-side spring elements 1.1, such that, in the absence of stop counter forces, a positive rotary drive between the gear wheel 1 and the carrier 2 is ensured.

If the closing part runs against an obstacle or, in particular, against a limit stop, e.g., in an upper closed position or a lower open position of a motor vehicle window, the normal force sufficient for the positive rotary drive is exceeded. When there is a relative movement between the carrier plate 2, which is checked by the limit stop, and the gear wheel 1, which the electric motor at least initially continues to drive, the cams 2.1 of the carrier 2 slide tangentially in either rotation direction along stop bevels 1.11 or 1.12. The spring elements 1.1 elastically bend away in the direction of the recesses 1.5, wherein this bending movement is limited by the limit stops 1.2. Due to the elastic absorption, an excessive impact loading of the gear wheel 1 is avoided. The degree of the elastic absorption is determined through the form and the connection of the spring elements 1.1 to the gear wheel 1; through the form and the strength of the stop bevels 1.11, 1.12; and through the limit stops 1.2.

Advantageously, the gear wheel 1 and the carrier 2 are configured for a play-free fit after assembly. Preferably, the stop bevels 1.11, 1.12 are configured for a mutual relative movement between the gear wheel 1 and the carrier 2, which is free from self-locking of the spring elements 1.1 and the cams 2.1 that press against the spring elements 1.1. This is accomplished in that the cams 2.1, after elimination of the stop force, automatically return to their normal operational rotary drive position (in which the cams are essentially centered on the indentations 1.3) between the spring elements 1.1.

A driven coupling element 2.2, particularly an output gear, is integrally molded onto the carrier 2 so that it axially protrudes. During final assembly of a cable-controlled motor vehicle window regulator, the output gear is fitted together with a cable sheave of the window regulator.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A gear-motor closing part drive, comprising:

a drive-side gear wheel; and a driven-side carrier that is in rotary driving engagement with the drive-side gear wheel;

wherein at least one of the gear wheel and the carrier has at least one of integral elastic spring elements and cams;

wherein the cams are configured to press against the integral elastic spring elements in order to provide mutual stop absorption when a mutual relative rotational movement between the gear wheel and the carrier occurs because movement of the carrier is inhibited, while the gear wheel continues to be driven;

wherein the spring elements comprise spring segments, which extend substantially tangentially, which have stopping bevels, and which are arranged such that they are radially elastically deformed by the cams, when the cams slidingly run against and press against the stopping bevels; and wherein the gear wheel and the carrier are configured as a unitary injection molded part.

2. The gear-motor closing part drive of claim 1, wherein the stopping bevels are configured such that the mutual rotational relative movement between the gear wheel and the carrier is free from self-locking between the spring elements and the cams.

3. The gear-motor closing part drive of claim 1,
wherein the spring elements comprise connections that are formed onto and spaced around at least one of the gear wheel and the carrier and that support the spring segments; and
wherein, when the mutual rotational relative movement occurs, the cams are configured to elastically push the spring segments into recesses that are arranged between the connections of the spring elements.

4. The gear-motor closing part drive of claim 3, wherein a degree of the radial elastic deformation of the spring elements is limited by a limit stop that is integrally formed onto at least one of the gear wheel and the carrier.

5. The gear-motor closing part drive of claim 1, wherein the gear wheel and the carrier are configured to provide a play-free fit when the gear wheel and the carrier are arranged in a mutual operating position.

6. The gear-motor closing part drive of claim 1, wherein the unitary injection molded part is composed of parts that can be drawn in an axial direction only.

7. The gear-motor closing part drive of claim 1, wherein the carrier further comprises a driven element.

8. The gear-motor closing part of claim 7, wherein the carrier with the driven element is integrally injection molded as a unitary piece.

9. A device, comprising:
a gear wheel;
a carrier wheel that, in operation, engages the gear wheel and rotates about a common axis with the gear wheel;
a plurality of spring elements; and
a plurality of cams that, in operation, actuate the spring elements during relative rotational movement of the gear wheel and the carrier wheel;
wherein, in production, the gear wheel and the carrier wheel are interconnected injection molded parts offset along a common axis of the gear wheel and the carrier wheel; and
wherein, in operation, the spring elements and the cams provide engagement is between the gear wheel and the carrier wheel, and dampen the relative rotational movement between the gear wheel and the carrier wheel.

10. A method for producing a gear-motor closing part drive, comprising:
producing a gear wheel and a carrier as separate, axially superimposed injection molded parts that are cast in a common injection mold; and
connecting the gear wheel and the carrier via integrally injection-molded connecting brackets that are pulled off when the gear wheel and the carrier are fit together from an injection molded position into a mutual operating position in order to form an assembly unit.

11. A method, comprising:
in an injection molding operation, forming a gear wheel and a carrier, wherein the gear wheel and the carrier are spaced from one another along a common axis, wherein the gear wheel and the carrier are connected by a plurality of brackets, and wherein the gear wheel, the carrier, and the brackets are integrally formed of injection molded plastic; and
breaking the connection formed by the brackets by forcing the gear wheel and the carrier into an overlapping position on the common axis.

12. A gear-motor closing part, drive, comprising:
a drive-side gear wheel; and
a driven-side carrier that is in rotary driving engagement with the drive-side gear wheel;
wherein at least one of the gear wheel and the carrier has at least one of integral elastic spring elements and cams;
wherein the cams are configured to press against the integral elastic spring elements in order to provide mutual stop absorption when a mutual relative rotational movement between the gear wheel and the carrier occurs because movement of the carrier is inhibited, while the gear wheel continues to be driven;
wherein the spring elements comprise spring segments, which extend substantially tangentially, which have stopping bevels, and which are arranged such that they are radially elastically deformed by the cams, when the cams slidingly run against and press against the stopping bevels; and
wherein a degree of the radial elastic deformation of the spring elements is limited by a limit stop that is integrally formed onto a receiving component of at least one of the gear wheel and the carrier.

13. The gear-motor closing part drive of claim 12, wherein the stopping bevels are configured such that the mutual rotational relative movement between the gear wheel and the carrier is free from self-locking between the spring elements and the cams.

14. The gear-motor closing part drive of claim 12,
wherein the spring elements are tangentially formed onto an end face of at least one of the gear wheel and the carrier; and
wherein, when the mutual rotational relative movement occurs, the cams are configured to elastically push the spring elements into recesses that are arranged between the end faces of the spring elements.

15. The gear-motor closing part drive of claim 14, wherein a degree of the radial elastic deformation of the spring elements is limited by a limit stop that is integrally formed onto a receiving component of at least one of the gear wheel and the carrier.

16. The gear-motor closing part drive as of claim 12, wherein the gear wheel and the carrier are configured to provide a play-free fit when the gear wheel and the carrier are arranged in a mutual operating position.

17. The gear-motor closing part drive of claim 12, wherein the gear wheel and the carrier are configured as a unitary injection molded part, composed of parts that can be drawn in an axial direction only.

18. The gear-motor closing part drive of claim 12, wherein the carrier further comprises a driven element.

19. The gear-motor closing part of claim 18, wherein the carrier with the driven element is integrally injection molded as a unitary pieced.

* * * * *